United States Patent
Kawasaki et al.

(10) Patent No.: US 7,144,039 B2
(45) Date of Patent: Dec. 5, 2006

(54) VEHICLE FRONT BODY STRUCTURE

(75) Inventors: Satoshi Kawasaki, Kawachi-gun (JP);
Tomohiro Fukazu, Shioya-gun (JP);
Hiroyuki Hattori, Kawachi-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 342 days.

(21) Appl. No.: 10/703,955

(22) Filed: Nov. 7, 2003

(65) Prior Publication Data
US 2004/0090085 A1    May 13, 2004

(30) Foreign Application Priority Data
Nov. 11, 2002   (JP)  ............. P2002-326810

(51) Int. Cl.
*B62D 7/22*   (2006.01)
(52) U.S. Cl. .............. 280/784; 280/124.109; 180/232; 296/187.12; 296/204
(58) Field of Classification Search .......... 280/781, 280/784, 124.109; 296/187.03, 187.09, 187.12, 296/203.02, 204; 180/58, 60, 299, 65.1, 180/312, 232
See application file for complete search history.

(56) References Cited

U.S. PATENT DOCUMENTS

| | | | | |
|---|---|---|---|---|
| 3,881,742 A | * | 5/1975 | Felzer | 280/784 |
| 5,042,837 A | * | 8/1991 | Kleinschmit et al. | 280/784 |
| 5,114,184 A | * | 5/1992 | Shimomura et al. | 280/784 |
| 5,381,871 A | * | 1/1995 | Ohta | 180/296 |
| 5,409,264 A | * | 4/1995 | Nakatani | 280/834 |
| 5,950,756 A | * | 9/1999 | Satoh et al. | 180/312 |
| 6,109,654 A | * | 8/2000 | Yamamoto et al. | 280/784 |
| 6,131,685 A | * | 10/2000 | Sakamoto et al. | 180/232 |
| 6,209,672 B1 | * | 4/2001 | Severinsky | 180/65.2 |
| 6,390,224 B1 | * | 5/2002 | Yoshida | 180/312 |
| 6,402,229 B1 | * | 6/2002 | Suganuma | 296/203.02 |
| 6,722,696 B1 | * | 4/2004 | Sonomura et al. | 280/784 |
| 6,824,168 B1 | * | 11/2004 | Kawazu et al. | 280/834 |
| 6,866,115 B1 | * | 3/2005 | Miyasaka | 180/311 |
| 6,869,090 B1 | * | 3/2005 | Tatsumi et al. | 280/124.09 |
| 6,880,663 B1 | * | 4/2005 | Fujiki et al. | 180/232 |
| 6,957,846 B1 | * | 10/2005 | Saeki | 296/187.1 |

FOREIGN PATENT DOCUMENTS

| | | |
|---|---|---|
| JP | 2002-240739 | 8/2002 |
| JP | 8-192639 | 7/2003 |

* cited by examiner

*Primary Examiner*—Paul N. Dickson
*Assistant Examiner*—Toan C. To
(74) *Attorney, Agent, or Firm*—Hamre Schumann Mueller & Larson, PC

(57) ABSTRACT

A vehicle front body structure includes a pair of front side frames each of which has, at a rear portion thereof, an easily deformable portion that is easily deformable during a collision, a support frame for mounting a unit box thereon, which has a pair of rear legs that are fixed to the easily deformable portions of the pair of front side frames, and a pair of front legs that are fixed to portions of the pair of front side frames, the portions being located in the front as viewed from the easily deformable portions. Displacement allowing spaces for allowing displacement of the unit box during a collision are provided near side portions of the unit box adjacent to the rear legs.

1 Claim, 5 Drawing Sheets

VEHICLE FRONT BODY STRUCTURE

BACKGROUND OF THE INVENTION

1. Field of the Invention

The present invention relates to a vehicle front body structure.

Priority is claimed on Japanese Patent Application No. 2002-326810, filed Nov. 11, 2002, the content of which is incorporated herein by reference.

2. Description of Related Art

As an example of a vehicle front body structure, a structure is known, which includes front side frames which are formed so as to be deformed in an upwardly convex shape, and a fuel cell housing for holding a fuel cell stack disposed above the front side frames, which is also formed so as to be deformed in an upwardly convex shape. In the event of collision, in order to absorb impact energy, the front side frames and the fuel cell housing are intentionally made so as to bend, and the fuel cell is made so as to break apart (see, for example, Japanese Unexamined Patent Application, First Publication No. Hei 08-192639).

In one type of head-on collision of a vehicle, an offset collision may occur in which an impact is mainly applied to one side of the vehicle front body. In the case of the above-mentioned vehicle front body structure, a fuel cell stack and a unit box including a fuel cell housing may be unnecessarily broken during such an offset collision. Such a problem may also be encountered in the case in which the unit box may be of another type such as a control unit box.

SUMMARY OF THE INVENTION

In view of the above circumstances, an object of the present invention is to provide a vehicle front body structure in which a unit box will not be unnecessarily broken during an offset collision.

In order to achieve the above object, the present invention provides a vehicle front body structure including: a pair of front side frames each of which has, at a rear portion thereof, an easily deformable portion that is easily deformable during a collision; a support frame for mounting a unit box thereon, which has a pair of rear legs that are fixed to the easily deformable portions of the pair of front side frames, and a pair of front legs that are fixed to portions of the pair of front side frames, the portions being located in the front as viewed from the easily deformable portions, wherein displacement allowing spaces for allowing displacement of the unit box during a collision are provided near side portions of the unit box adjacent to the rear legs.

According to the vehicle front body structure as configured above, because the pair of rear legs of the support frame are fixed to the easily deformable portions of the front side frames, and the pair of front legs are fixed to portions of the front side frame located in the front as viewed from the easily deformable portion, when the easily deformable portion of one of the front side frames deforms during an offset collision in which an impact force in applied to one of the front side frames, the unit box supported by the support frame rotates about one of the front legs fixed to the other of the front side frames to which the impact force is not applied. As a result, displacement of the unit box near the front legs is restrained, and a portion of the unit box near the rear legs mainly moves laterally. This lateral displacement of the unit box is allowed by the displacement allowing space which is provided near the side portion of the unit box adjacent to the rear leg. Because the unit box is guided into the displacement allowing space as described above, the unit box is prevented from being broken.

In the above vehicle front body structure, another space may be provided near a side portion of the unit box adjacent to one of the front legs. The space may be made narrower in the lateral direction of the vehicle than each of the displacement allowing spaces.

According to the vehicle front body structure as configured above, because the space, which is located near the side portion of the unit box adjacent to the front leg, is made narrow, displacement of the unit box in the space is restrained; therefore, the rotation of the unit box about the front leg can be ensured.

The vehicle front body structure may further include: a driving motor disposed under the unit box; and high voltage lines extending from the unit box to the driving motor. The high voltage lines may extend from a portion of the unit box adjacent to one of the front legs.

According to the vehicle front body structure as configured above, because the high voltage lines, which connect the unit box to the driving motor, extend from a portion of the unit box, the portion being located near the front legs at which the unit box just slightly moves during an offset collision, the high voltage lines will not be cut during the offset collision.

DETAILED DESCRIPTION OF THE INVENTION

A vehicle front body structure according to an embodiment of the present invention will be explained below with reference to the appended drawings. In the following description, a longitudinal direction and a lateral direction are respectively defined on the basis of a plan view of a vehicle that travels in the longitudinal direction.

The vehicle front body structure according to the present embodiment is, more specifically, a vehicle front body structure for a fuel cell powered vehicle which is driven by a drive motor that is supplied with electrical power from a fuel cell stack.

Figure 1:
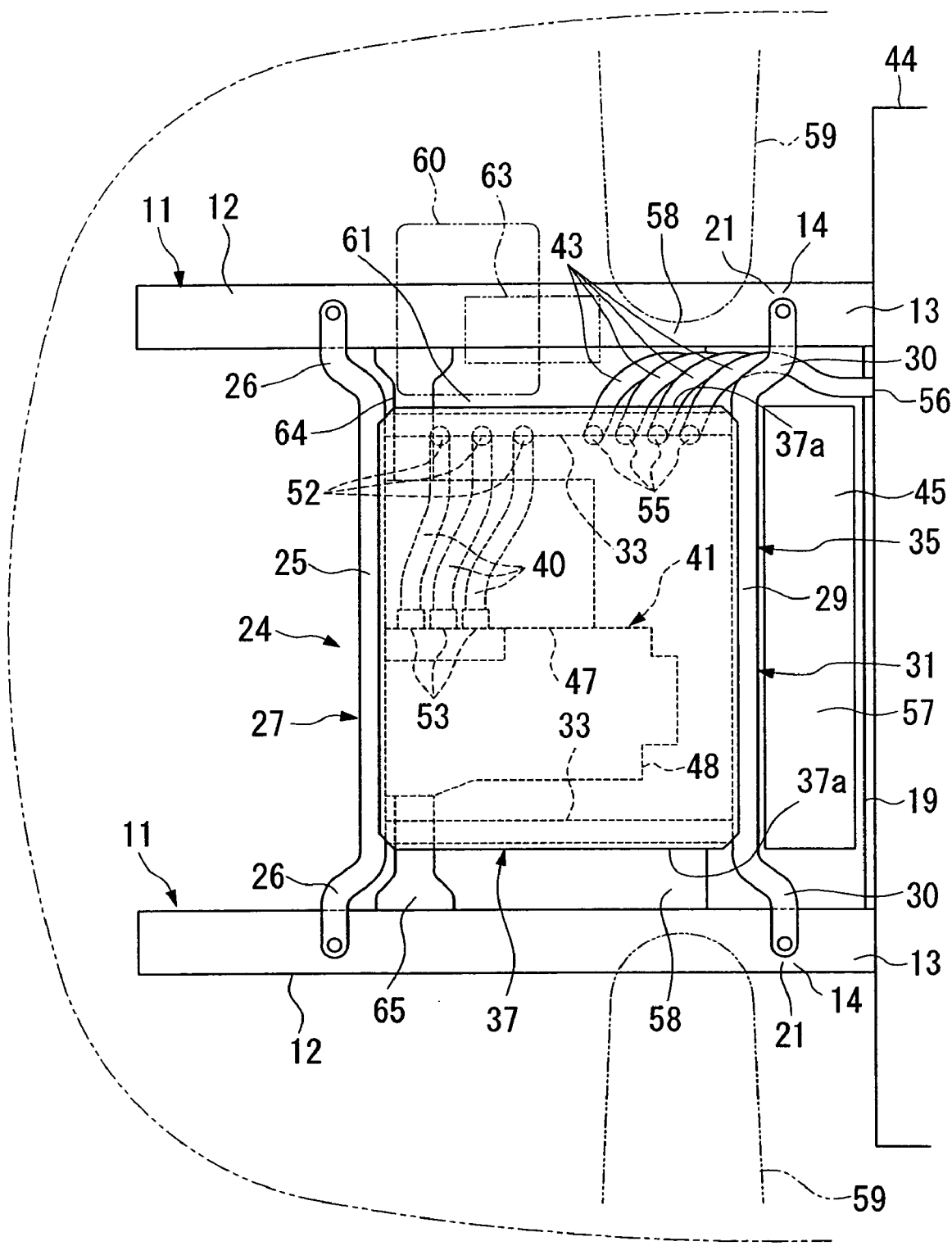
FIG. 1 is a plan view showing a vehicle front body structure according to an embodiment of the present invention.
Figure 2:
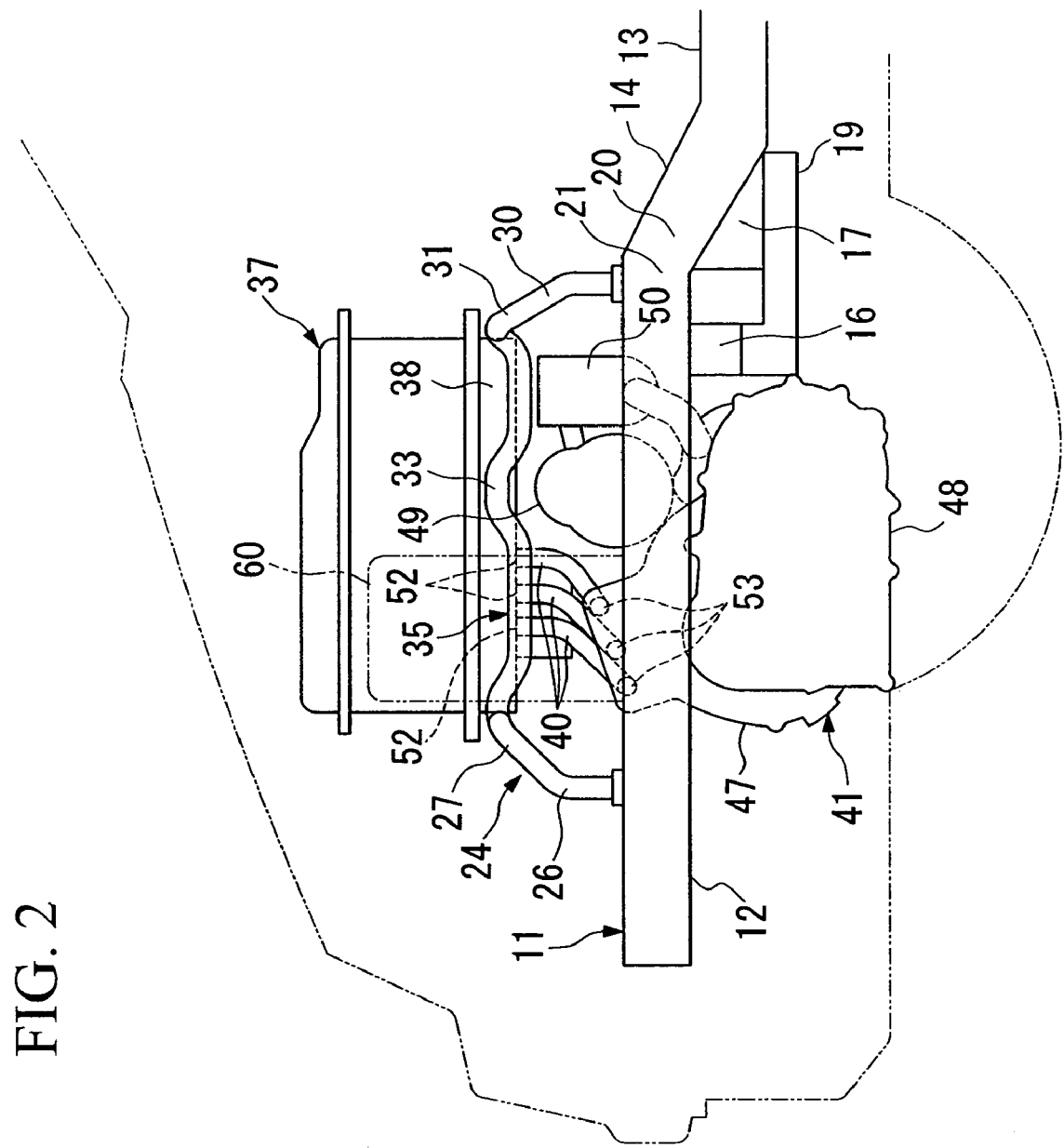
FIG. 2 is a side view showing the vehicle front body structure according to the embodiment of the present invention.
Figure 3:
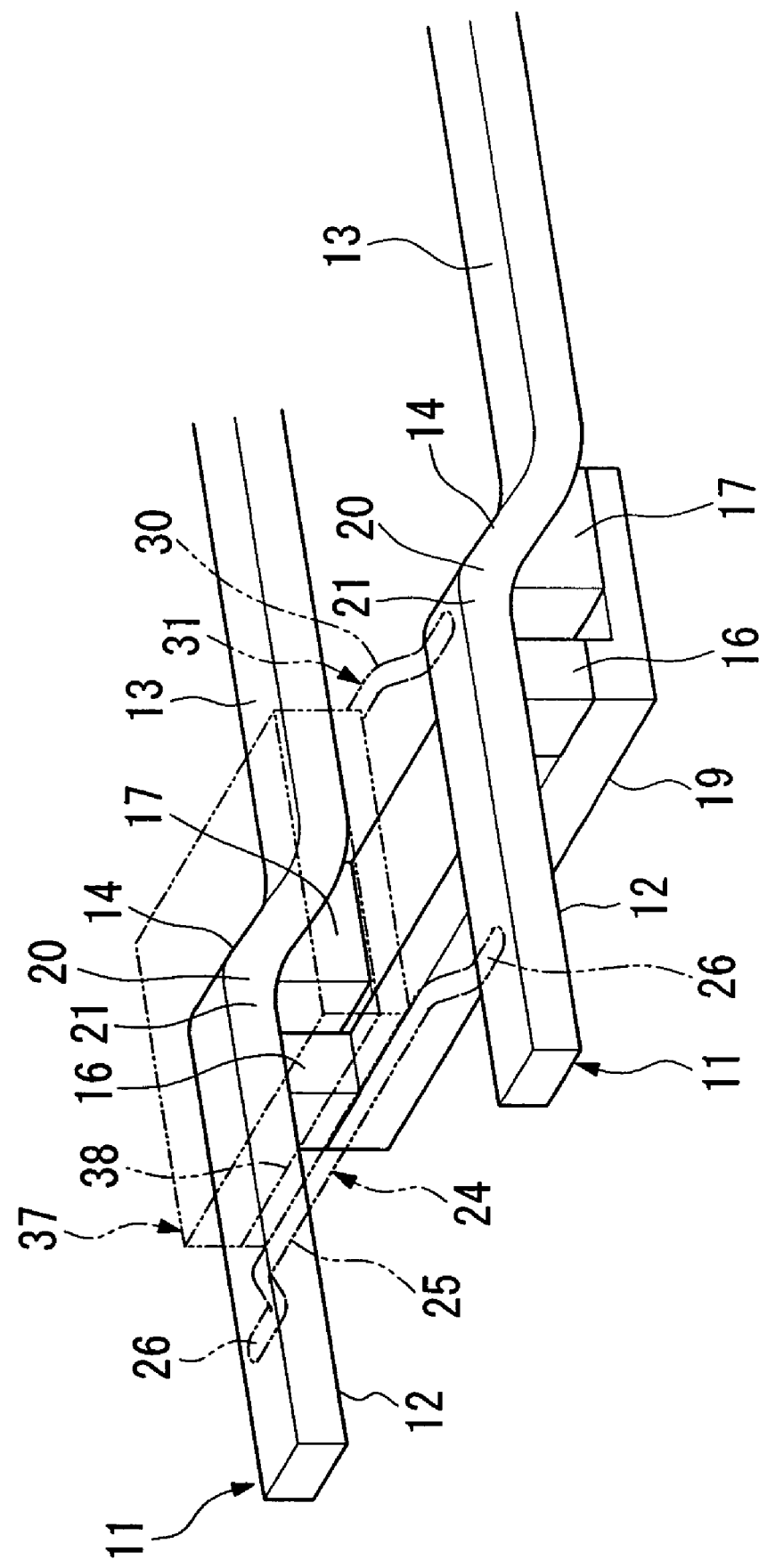
FIG. 3 is a perspective view showing the vehicle front body structure according to the embodiment of the present invention.

As shown in FIGS. 1 to 3, in the front portion of a vehicle body, there are provided a laterally arranged pair of front side frames 11 as main structural body members, each of which extends in the longitudinal direction of the vehicle. Each of the front side frames 11 is formed in a stepped shape, and includes a front extending portion 12 which occupies a front portion of the front side frame 11 while horizontally extending in the longitudinal direction, a rear extending portion 13 which occupies a rear portion of the front side frame 11 while horizontally extending in the longitudinal direction at a level lower than the front extending portion 12, and a connection portion 14 which is formed in a curved shape, and which connects the front extending portion 12 to the rear extending portion 13 by being disposed therebetween.

Each of the front extending portions 12 is provided with a front mount 16 at the rear end portion thereof, which projects downward from the underside of the front extending portion 12. Each of the connection portions 14 is provided with a rear mount 17 extending downward. There is a gap between the front mount 16 and the rear mount 17.

The pair of front side frames 11 are connected to each other by a front cross beam 19 extending laterally, which is one of the main structural body members. The front cross beam 19 is fixed to the undersides of the front and rear mounts 16 and 17 of the pair of front side frames 11 so as to bridge the front and rear mounts 16 and 17.

Figure 4:
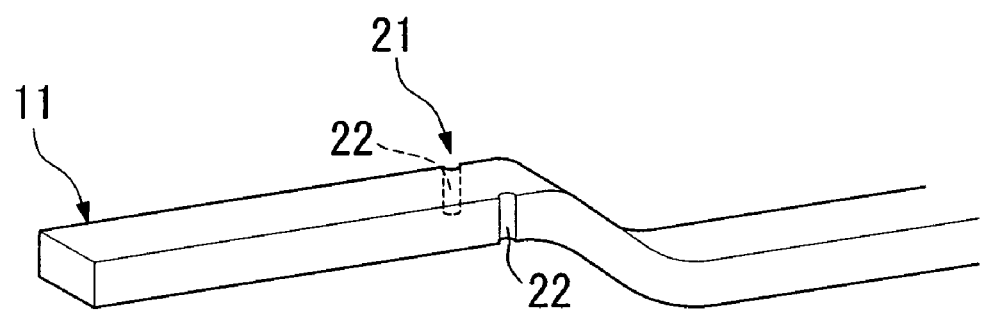
FIG. 4 is a perspective view showing another example of front side frames in the vehicle front body structure according to the embodiment of the present invention.

Each of the front side frames 11 includes a high rigidity portion 20 which has the largest cross-section when taken along a plane perpendicular to the longitudinal direction, and which is formed by the connection portion 14 and the rear mount 17. A portion in front of the high rigidity portion 20, i.e., the end portion of the front extending portion 12 is designated as an easily deformable portion 21 which deforms before other portions deform when a front-to-rear load is applied to the front side frame 11 because the cross-section of the easily deformable portion 21 taken along a plane perpendicular to the longitudinal direction is smaller than that of the high rigidity portion 20, and the cross-section steeply changes from the easily deformable portion 21 to the high rigidity portion 20. Instead of steeply changing the cross-section in order to form the easily deformable portion 21, grooves 22 for facilitating deformation may be formed as shown in FIG. 4. Alternatively, holes may be formed in the front side frames 11.

A support frame 24 bridges the pair of front side frames 11. The support frame 24 includes a front frame member 27, a rear frame member 31, and a pair of connection frame members 33. As viewed in a state in which the support frame 24 is attached to the pair of front side frames 11, the front frame member 27 includes a front middle portion 25 extending laterally, and a laterally arranged pair of front legs 26 which obliquely and downwardly extend from the ends of the front middle portion 25, respectively. The rear frame member 31 includes a rear middle portion 29 extending laterally, and a laterally arranged pair of rear legs 30 which obliquely and downwardly extend from the ends of the front middle portion 29, respectively. Each of the pair of connection frame members 33 extends in the longitudinal direction and connects an end of the front middle portion 25 of the front frame member 27 to an end of the rear middle portion 29 of the rear frame member 31. Accordingly, the support frame 24 includes a support portion 35 which is formed in a rectangular frame shape while having the front middle portion 25 of the front frame member 27, the rear middle portion 29 of the rear frame member 31, and the pair of connection frame members 33, and two pairs of legs, i.e., two front legs 26 that are disposed in front of the support portion 35 and two rear legs 30 that are disposed in the rear of the support portion 35. One of the front legs 26 disposed in the left and one of the rear legs 30 disposed in the left are fixed to the left side frame 11 using bolts or the like. One of the front legs 26 disposed in the right and one of the rear legs 30 disposed in the right are fixed to the right side frame 11 using bolts or the like.

More specifically, each of the pair of rear legs 30 is fixed to an upper face of a portion of the front side frames 11 near the easily deformable portion 21, i.e., each of the pair of rear legs 30 is fixed to a portion of the front side frame 11 located immediately above the easily deformable portion 21, and each of the pair of front legs 26 is fixed to an upper face of a portion of the front side frame 11 located in the front as viewed from the easily deformable portion 21. Each of the pair of rear legs 30 may be fixed to a portion of the front side frame 11 not located immediately above the easily deformable portion 21, but located in the front as viewed from the easily deformable portion 21 and near the easily deformable portion 21. The front legs 26 and the rear legs 30 that extend from the support portion 35 are deformable easier than the support portion 35 which is formed in a rectangular frame shape. More specifically, the front legs 26 and the rear legs 30 are easily deformable in the lateral direction because the front legs 26 and the rear legs 30 obliquely and laterally extend from the ends of the front frame member 27 extending laterally and from the ends of the rear frame member 31 extending laterally, respectively.

A PCU box 37 (i.e., a unit box) formed in a substantially rectangular parallelepiped shape, which houses a power control unit (PCU), is mounted on the support frame 24. The PCU box 37 is fixed to the support portion 35 oriented in such a manner that each of the sides of the PCU box 37 extends in the lateral or longitudinal direction of the vehicle as viewed in plan view. The bottom portion of the PCU box 37 is formed by a base plate 38 which includes a thick aluminum plate, so that the PCU box 37 is hardly deformable in the horizontal direction. The base plate 38 may be formed as a heat sink so that cooling of the PCU box is accelerated.

The PCU box is located in the front portion of the vehicle body while being positioned in the middle area in terms of the lateral direction. A power unit 41, which is connected to the PCU box 37 via high voltage lines 40, is disposed under the PCU box 37 while being separated from the PCU box 37. Moreover, a fuel cell stack 44, which is connected to the PCU box 37 via high voltage lines 43, is disposed behind the PCU box 37 and the power unit 41, and an intake device 45 for the fuel cell stack 44 is disposed between the PCU box 37 and the fuel cell stack 44.

The power unit 41 is, overall, located in the middle area in terms of the lateral direction. The power unit 41 includes a driving motor 47 disposed in the right, a transmission 48 disposed in the left, a mechanical super charger 49 for forcibly supplying air to the fuel cell stack 44 while being disposed above the driving motor 47, and an intercooler 50 disposed immediately behind the mechanical super charger 49.

As mentioned above, high voltage lines 40, which extend from the PCU box to the driving motor 47, are accommodated between the PCU box 37 and the driving motor 47 of the power unit 41 that is disposed under the PCU box 37. The high voltage lines 40 extend from connecting portions 52 of the PCU box 37, which are located near the front leg 26 of the support frame 24. More specifically, the connecting portions 52 of the PCU box 37, from which the high voltage lines 40 extend, are located near one of the front legs 26 of the support frame 24, which is located at the side same as the driver's seat (i.e., the right side in the case of a right-hand drive vehicle), and the high voltage lines 40 are connected to connecting portions 53 provided at a front portion of the power unit 41 and in the middle area in terms of the lateral direction of the vehicle.

The aforementioned high voltage lines 43, which connect the PCU box 37 to the fuel cell stack 44 disposed behind the PCU box 37, extend backward from connecting portions 55 provided near a corner portion of the PCU box 37, the corner portion being disposed near one of the rear legs 30 of the support frame 24, which is located at the side which is the same as the driver's seat. The high voltage lines 43 are connected to connecting portions 56 provided on the front face of the fuel cell stack 44 and at the side same as the driver's seat.

Near the right and left side portions of the PCU box 37 adjacent to the rear legs 30, there are respectively provided displacement allowing spaces 58 for allowing displacement of the PCU box 37 during a collision.

More specifically, each of the displacement allowing spaces 58 is formed between a right or left side face 37a of the PCU box 37 and a damper housing 59. In addition, another displacement allowing space 57 for allowing displacement of the PCU box 37 during a collision is formed behind the PCU box 37.

Furthermore, near the side portion of the PCU box 37 adjacent to the front legs 26, there is provided another space 61 which is narrower, in the lateral direction, than displacement allowing spaces 58. More specifically, there is provided an air conditioner compressor 60, which is an element having high rigidity, near the front leg 26 of the support frame 24 for the PCU box 37, and the space 61 is formed between the side face 37a of the PCU box 37 and the air conditioner compressor 60 which faces the side face 37a. The air conditioner compressor 60 is mounted on one of the front side frames 11 which is located at the side same as the driver's seat; therefore, the space 61 is also located at the side which is the same as the driver's seat with respect to the PCU box 37.

On the same front side frame 11, a battery 63 for electrical accessories, which is an element having high rigidity, and a unit mount 64 for supporting one side of the power unit 41, which is also an element having high rigidity, are mounted. The battery 63 and the unit mount 64 are disposed near the front legs 26 for the PCU box 37.

On the other front side frame 11, another unit mount 65 for supporting the other side of the power unit 41, which is also an element having high rigidity, is mounted. The unit mount 65 is disposed near the other front legs 26 for the PCU box 37.

Figure 5:
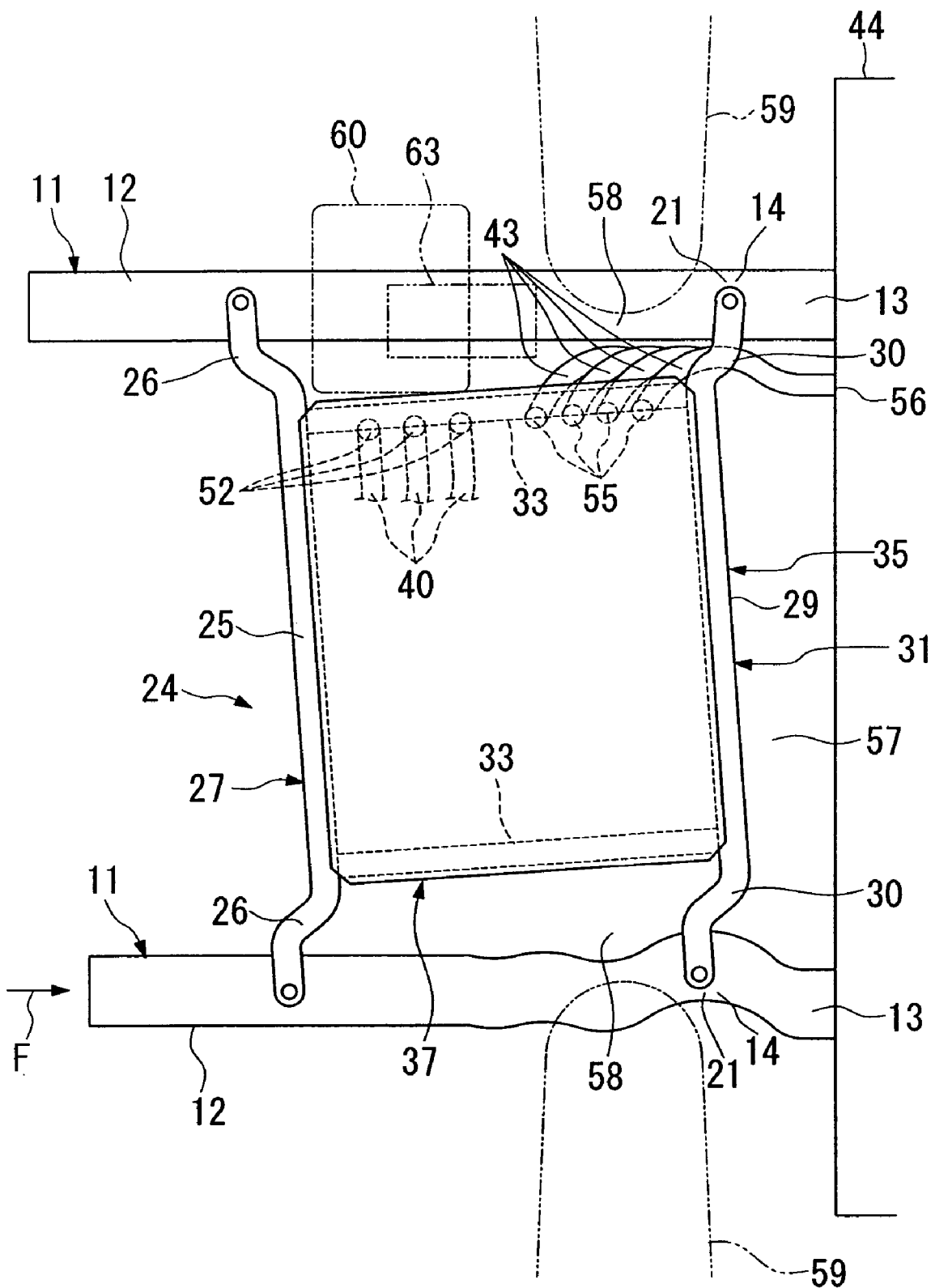
FIG. 5 is a plan view showing the vehicle front body structure according to an embodiment of the present invention after a collision.

In the above embodiment of the vehicle front body structure, because the pair of rear legs 30 of the support frame 24 are fixed to portions of the front side frames 11 near the easily deformable portions 21, and the pair of front legs 26 are fixed to portions of the front side frames 11 located in the front as viewed from the easily deformable portions 21, when, for example, an impact force F is applied to one of the front side frames 11 during an offset collision, and the easily deformable portion 21 of the front side frame 11 deforms as shown in FIG. 5, the support frame 24 exhibits displacement in such a manner that one side of the support frame 24, i.e., the same side as the front side frame 11 having the deformed easily deformable portion 21, moves backward. As a result, the PCU box 37 supported by the support frame 24 rotates about one of the front legs 26 fixed to one of the front side frames 11 to which the impact force F is not applied, while at the same time, the front legs 26 and the rear legs 30 of the support frame 24 are deformed. FIG. 5 shows a state in which the impact force F is applied to one of the front side frames 11 disposed at the side opposite the driver's seat, which frequently occurs in offset collisions. In this case, displacement of the PCU box 37 near the front legs 26 is restrained, and a portion of the PCU box 37 near the rear legs 30 mainly moves laterally. This lateral displacement of the PCU box 37 is allowed by the displacement allowing space 58 which is provided near the side portion of the PCU box 37 adjacent to the rear leg 30. Because the PCU box 37 is guided into the displacement allowing space 58 as described above, the PCU box 37 is prevented from being broken. Accordingly, unnecessary breakage of the PCU box 37 during an offset collision can be prevented. The PCU box 37 also moves backward, and this displacement is allowed by the displacement allowing space 57 which is provided behind the PCU box 37.

Because the space 61, which is located near the side portion of the PCU box 37 adjacent to the front leg 26, is made narrow, displacement of the PCU box 37 in the space 61 is restrained; therefore, the rotation of the PCU box 37 about the front leg 26 can be ensured. The narrow space 61 is located at the side same as the driver's seat in order to ensure the rotation of the PCU box 37 during an offset collision in which an impact force is applied to one of the front side frames 11 disposed at the side opposite the driver's seat, which frequently occurs in offset collisions.

Figure 6:
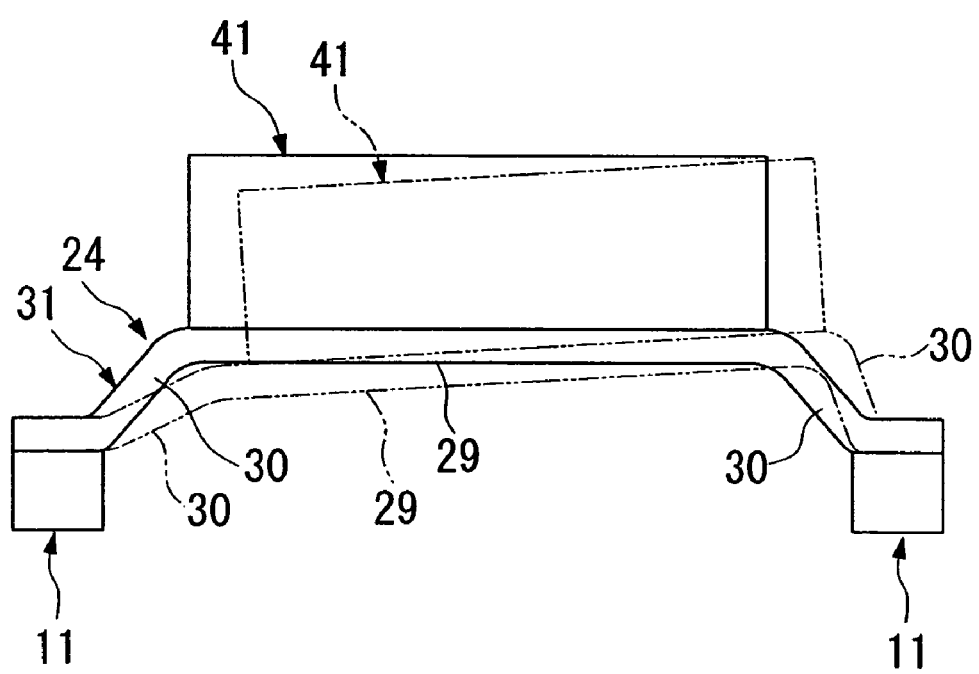
FIG. 6 is a forward view showing a support frame and a PCU box included in the vehicle front body structure according to an embodiment of the present invention before and after a collision.

In addition, the rotation of the PCU box 37 about the front leg 26 can be more reliably ensured if the legs of the support frame 24, specifically, the rear legs 30, are made easily deformable in the lateral direction as shown in FIG. 6.

Moreover, in the above embodiment, the unit mounts 64 and 65, and the air conditioner compressor 60, which are elements having high rigidity and are disposed adjacent to the PCU box 37, are mounted on portions of the front side frames 11 near the front legs 26 of the support frame 24; therefore, the support frame 24 can resist a greater load in the lateral direction at the front legs 26 than at the rear legs 30, and accordingly, deformation of the support frame 24 is smaller at the front legs 26 than at the rear legs 30. As a result, the rotation of the PCU box 37 about the front leg 26 can be more reliably ensured.

Furthermore, because the high voltage lines 40, which connect the PCU box 37 to the driving motor 47, extend from the connection portions 52 that are located near the front legs 26 at which the PCU box 37 just slightly moves during an offset collision, the connection portions 52 also moves just slightly during the offset collision; therefore, the high voltage lines 40 will not be cut during the offset collision. Specifically in the above embodiment, because the high voltage lines 40 extend from a position near the front leg 26 that is located at the side same as the driver's seat taking into account that the rotation of the PCU box 37 occurs during an offset collision in which an impact force is applied to one of the front side frames 11 disposed at the side opposite the driver's seat, which frequently occurs in offset collisions, cut of the high voltage lines 40 during the offset collision can be effectively prevented.

In addition, because the high voltage lines 43 extend from a portion of the PCU box 37 near the corner portion thereof, the corner portion being disposed near one of the rear legs 30 of the support frame 24, which is located at the side same as the driver's seat, and the high voltage lines 43 are connected to a portion of the fuel cell stack 44 disposed behind the PCU box 37, the portion being located at the side which is the same as the driver's seal, tension will not be applied to the high voltage lines 43 even when the PCU box 37 rotates during an offset collision; therefore, cut of the high voltage lines 43 during the offset collision can be prevented.

Advantageous Effects Obtainable by the Invention

As explained above, according to the vehicle front body structure of the present invention, because the pair of rear legs of the support frame are fixed to the easily deformable portions of the front side frames, and the pair of front legs are fixed to portions of the front side frame located in the front as viewed from the easily deformable portion, when the easily deformable portion of one of the front side frames deforms during an offset collision in which an impact force in applied to one of the front side frames, the unit box supported by the support frame rotates about one of the front legs fixed to the other of the front side frames to which the impact force is not applied. As a result, displacement of the unit box near the front legs is restrained, and a portion of the unit box near the rear legs mainly moves laterally. This lateral displacement of the unit box is allowed by the displacement allowing space which is provided near the side portion of the unit box adjacent to the rear leg. Because the unit box is guided into the displacement allowing space as described above, the unit box is prevented from being broken. Accordingly, unnecessary breakage of the unit box during an offset collision can be prevented.

According to another vehicle front body structure of the present invention, because the space, which is located near the side portion of the unit box adjacent to the front leg, is made narrow, displacement of the unit box in the space is restrained; therefore, the rotation of the unit box about the front leg can be ensured.

According to another vehicle front body structure of the present invention, because the high voltage lines, which connect the unit box to the driving motor, extend from a portion of the unit box, the portion being located near the front legs at which the unit box just slightly moves during an offset collision, the high voltage lines will not be cut during the offset collision.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A vehicle front body structure comprising:
   a pair of front side frames located at a front of the vehicle, each of the front side frames has a front portion and a deformable portion to the rear of the front portion that is configured to more easily deform when compared to the front portion during a passenger's side offset collision;
   a support frame with a unit box mounted thereon, the support frame being disposed above the front side frames and has a rear middle portion with a pair of rear legs that obliquely and downwardly extend from the rear middle portion and are fixed to the deformable portions of the pair of front side frames, and a front middle portion with a pair of front legs that obliquely and downwardly extend from the front middle portion and are fixed to the front portions of the pair of front side frames;
   a driving motor disposed under the unit box;
   a first set of high voltage lines disposed on a driver's side of the vehicle and extending from the unit box to the driving motor;
   a fuel cell stack behind the unit box;
   a second set of high voltage lines extending from the unit box, near a rear corner thereof adjacent to one of the rear legs on the driver's side of the vehicle, to the fuel cell stack;
   displacement allowing spaces for allowing displacement of the unit box during a passenger's side offset collision disposed near side portions, on the driver's side of the vehicle, of the unit box adjacent to the rear legs; and
   another space disposed near a side portion, on the driver's side of the vehicle, of the unit box adjacent to one of the front legs, the space being narrower in the lateral direction of the vehicle than each of the displacement allowing spaces,
   wherein the first set of high voltage lines extend from a portion of the unit box adjacent to the space that is narrower than each of the displacement allowing spaces.

* * * * *